United States Patent Office 2,739,965
Patented Mar. 27, 1956

2,739,965

SENSITIZING DYES CONTAINING A CHAIN ALKYL- OR ARYLTHIO GROUP

Edward B. Knott, Harrow, England, assignor to Eastman Kodak Company, Rochester, N. Y., a corporation of New Jersey No Drawing. Application September 25, 1953, Serial No. 382,459

14 Claims. (Cl. 260—240.1)

This invention relates to merocyanine dyes containing a chain substituent. More particularly, this invention relates to merocyanine dyes and complex merocyanine dyes containing an alkyl- or arylthio substituent on the intercyclic chain connecting two of the heterocyclic nuclei.

Certain merocarbocyanine dyes containing an alkoxyl substituent on the chain have been previously described. See, for example, Brooker and White U. S. Patents 2,478,366, issued August 9, 1947, and 2,494,031, issued January 10, 1950. Certain merocarbocyanine dyes containing an alkylthio substituent on the chain have also been previously described. However, complex merocyanine dyes containing an alkyl- or arylthio substituent on the intercyclic chain have not been previously described.

I have now found a new class of complex merocyanine dyes containing an alkyl- or arylthio group, attached to one of the carbon atoms in the heterocyclic chain.

It is, accordingly, an object of my invention to provide new complex merocyanine dyes. Still another object is to provide a method for making these new dyes. Another object is to provide a new method for making merocarbocyanine dyes containing an alkyl- or arylthio substituent on the intercyclic chain. Still another object is to provide photographic silver halide emulsions sensitized with my new complex merocyanine dyes. Other objects will become apparent from a consideration of the following description and examples.

The new complex merocyanine dyes of my invention can advantageously be represented by the following general formula:

I.

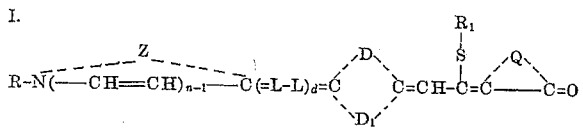

wherein R represents an alkyl group, such as methyl, ethyl, n-propyl, carbethoxymethyl, allyl (vinylmethyl), benzyl (phenylmethyl) etc., (e. g. an alkyl group of the formula $C_nH_{2n+1}$ wherein $n$ is a positive integer of from 1 to 3), $n$ represents a positive integer of from 1 to 2, $d$ represents a positive integer of from 1 to 2, $R_1$ represents an alkyl group, such as methyl, ethyl, n-propyl, isopropyl, n-butyl, isobutyl, n-amyl, n-hexyl, n-heptyl, n-octyl, n-lauryl, benzyl (phenylmethyl), carbethoxymethyl, etc., (e. g. an alkyl group of the formula $C_qH_{2q+1}$ wherein $q$ represents a positive integer of from 1 to 12), or an aryl group, such as phenyl, o-, m-, and p-tolyl, etc. (e. g. a mononuclear aromatic group of the benzene series), L represents a methine group (i. e. a —CH= group or a —CR'= group wherein R' represents an alkyl group, such as methyl, ethyl, etc., an alkoxyl group, such as methoxyl, ethoxyl, an alkylthio group, such as methylthio, ethylthio, etc., or an arylthio group, such as phenylthio, p-tolylthio, etc., or an aryl group, such as phenyl, p-tolyl, etc.), D and D₁ together represent the non-metallic atoms necessary to complete a thiazolidone nucleus, i. e. a 4-thiazolidone nucleus or a 5-thiazolidone nucleus (i. e. D and D₁ are different from one another and represent a sulfur atom or a

group wherein R₅ represents an alkyl group, such as methyl, ethyl, n-propyl, allyl, carboxymethyl, carbomethoxymethyl, carbethoxymethyl, etc., or an aryl group, such as phenyl, o-, m- and p-tolyl, etc.), Q represents the nonmetallic atoms necessary to complete a thiazole nucleus, such as a 2-thiothiazolid-4-one nucleus (i. e. a rhodanine nucleus) or a thiazol-5-one nucleus, and Z represents the non-metallic atoms necessary to complete a heterocyclic nucleus containing from five to six atoms in the heterocyclic ring, such as those selected from the group consisting of those of the thiazole series (e. g. thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), those of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e. g. α-naphthothiazole, β-naphthothiazole, 5-methoxy-β-naphthothiazole, 5-ethoxy-β-naphthothiazole, 8-methoxy-α-naphthothiazole, 7-methoxy-α-naphthothiazole, etc.), those of the thianaphtheno-7′,6′,4,5-thiazole series (e. g. 4′-methoxythianaphtheno-7′,6′,4,5-thiazole, etc.), those of the oxazole series (e. g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g. benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e. g. α-naphthoxazole, β-naphthoxazole, etc.), those of the selenazole series (e. g. 4-methylselenazole, 4-phenylselenazole, etc.), those of the benzoselenazole series (e. g. benzoselenazole, 5-chlorobenzoselenazole, 5-methoxybenzoselenazole, 5-hydroxybenzoselenazole, tetrahydrobenzoselenazole, etc.), those of the naphthoselenazole series (e. g. α-naphthoselenazole, β-naphthoselenazole, etc.), those of the thiazoline series (e. g. thiazoline, 4-methylthiazoline, etc.), those of the 2-quinoline series (e. g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e. g. quinoline, 6-methoxyquinoline, 7-methylquinoline, 8-methylquinoline, etc.), those of the 1-isoquinoline series (e. g. isoquinoline, 3,4-dihydroisoquinoline, etc.), those of the 3-isoquinoline series (e. g. isoquinoline, etc.), those of the benzimidazole series (e. g. 1,3-diethylbenzimidazole, 1-ethyl-3-phenylbenzimidazole, etc.), those of the 3,3-dialkylindolenine series (e. g. 3,3-dimethylindolenine, 3,3,5 - trimethylindolenine, 3,3,7 - trimethylindolenine, etc.), the pyridine series (e. g. pyridine, 5-methylpyridine, etc.), etc.

In accordance with my invention, I provide the dyes represented by Formula I above by condensing together a compound selected from those represented by the following two general formulas:

II.

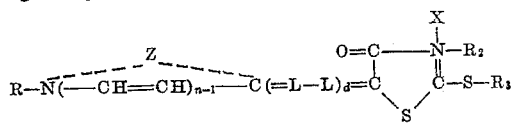

and

IIa.

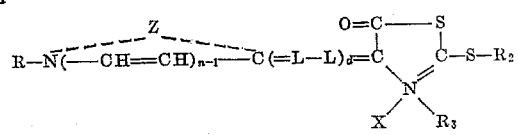

wherein R, Z, $n$, $d$ and L each have the values given above, $R_2$ and $R_3$ each represents an alkyl group, such as methyl, ethyl, allyl, carbethoxymethyl, etc., and X represents an acid radical, such as benzenesulfonate, p-toluenesulfonate, etc., with a compound selected from those represented by the following general formula:

III.

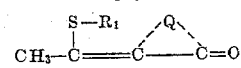

wherein $R_1$ and Q each have the values given above.

The condensation of the compounds of Formula II or IIa with those of Formula III can be carried out in the presence of a basic condensing agent, such as the trialkylamines (e. g. triethylamine, tri-n-propylamine, tri-n-butylamine, triisobutylamine, etc.), N-alkylpiperidines (e. g. N-methylpiperidine, N-ethylpiperidine, etc.), N,N-dialkylanilines (e. g. N,N-dimethylaniline, N,N-diethylaniline, etc.), etc. The condensations can advantageously be carried out in the presence of an inert solvent, such as pyridine, lower aliphatic alcohols (e. g. ethanol, n-propanol, n-butanol, etc.), 1,4-dioxane, etc. Heat accelerates the condensations, and temperatures varying from room temperature to the reflux temperature of the reaction mixture can be used.

The intermediates of Formula III above can be prepared as directed in my copending application Serial No. 380,603, filed September 16, 1953.

The intermediates represented by Formula II above can advantageously be prepared by heating together a compound selected from those represented by the following general formula:

IV.

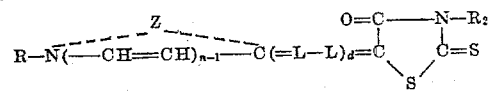

wherein R, $R_2$, $n$, $d$, L and Z each have the values given above, with an alkyl salt, such as those represented by the following general formula:

V.     $R_3$—X wherein $R_3$ and X each have the values given above. Such a process has been previously described in Fry et al. U. S. Patent 2,388,963, issued November 13, 1945, and Brooker U. S. Patent 2,454,629, issued November 23, 1948. The intermediates represented by Formula IV above are well known, as well as certain methods of making them. See, for example, Kendall U. S. Patent 2,265,908, issued December 9, 1941.

The intermediates represented by Formula IIa above can advantageously be prepared by heating together a compound selected from those represented by the following general formula:

VI.

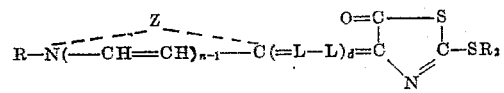

wherein R, $R_2$, $n$, $d$, L and Z each have the values given above, with an alkyl salt, such as those represented by Formula V above. Alternatively, the intermediates represented by Formula IIa above can be prepared by heating together a compound selected from those represented by the following general formula:

VII.

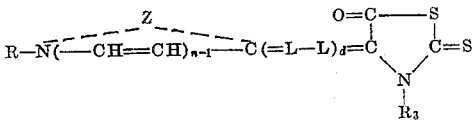

wherein R, $R_3$, $n$, $d$, L and Z each have the values given above, with an alkyl salt, such as those represented by the following general formula:

VIII.     $R_2$—X wherein $R_2$ and X each have the values given above. Intermediates represented by Formulas VI and VII have been previously described in the copending applications Serial No. 211,566, filed February 17, 1951 of Per Aubert and Edward B. Knott (now U. S. Patent 2,692,829, issued October 26, 1954) and Serial No. 203,526, filed December 29, 1950, of Roy A. Jeffreys and Edward B. Knott (now U. S. Patent 2,656,353, issued October 20, 1953).

The merocyanine dyes containing an alkyl- or arylthio substituent on the intercyclic chain comprise those dyes represented by the following two general formulas:

Ia.

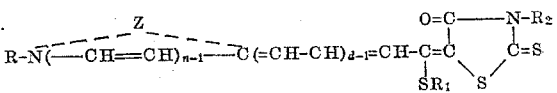

and

Ib.

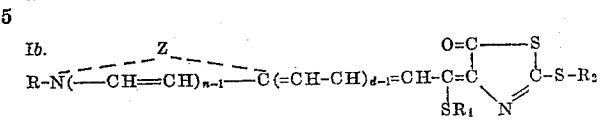

wherein R, $R_1$, $R_2$, $n$, $d$ and Z each have the values given above. Advantageously, the merocyanine dyes selected from those represented by Formulas Ia and Ib can be prepared by condensing a compound selected from those represented by Formula III above with a compound selected from those represented by the following general formula:

X.

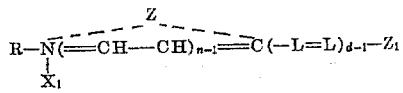

wherein R, $n$, $d$ and Z each have the values given above, $X_1$ represents an acid radical, such as chloride, bromide, iodide, thiocyanate, acetate, perchlorate, benzenesulfonate, p-toluenesulfonate, ethylsulfate, methylsulfate, etc., and $Z_1$ represents a reactive group, such as an alkylthio group (e. g. methylthio, ethylthio, etc.) an arylthio group (e. g. phenylthio, tolylthio, etc.), etc. Alternatively, when $d$ of Formula IX represents 2, $Z_1$ can be an arylamino group (e. g. phenylamino, acetanilido, etc.). The condensations of the compounds of Formula III with those of Formula IX can advantageously be carried out in the presence of a basic condensing agent, such as those basic condensing agents mentioned above for the condensation of the compounds of Formula II or IIa with those of Formula III. Likewise, the condensations of the compounds of Formula III with those of Formula IX can also be carried out in the presence of an inert solvent, such as those listed above for the condensation of the compounds of Formula II or IIa with those of Formula III. Heat accelerates the condensations, and temperatures varying from room temperature to the reflux temperature of the reaction mixture can be used.

The following examples will serve to illustrate more fully the manner whereby I practice my invention:

EXAMPLE 1

*3-carbethoxymethyl-5-[4-(3-ethylbenzoxazolin-2-ylidene)-1-ethylthiobut-2-en-1-ylidene]-2-thiothiazolid-4-one*

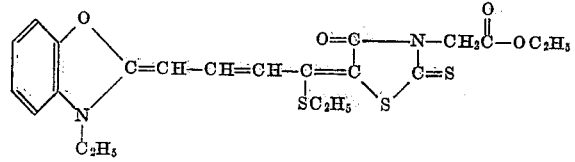

3-carbethoxymethyl - 5 - (1' - ethylthioethylidene-2-thiothiazolid-4-one (1.0 g.), 2-β-acetanilidovinylbenzoxazole ethiodide (1.45 g.), ethanol (10 cc.) and triethylamine (0.5 cc.) were refluxed for 5 minutes. The blue solution deposited the dye (0.7 g., 44%) on chilling. It formed steel blue threads, M. P. 172° C., from ethanol.

EXAMPLE 2

*3-carbethoxymethyl-5-[2 - (3 - ethylbenzthiazolin - 2 - ylidene)-1-ethylthioethylidene]-2-thiothiazolid-4-one*

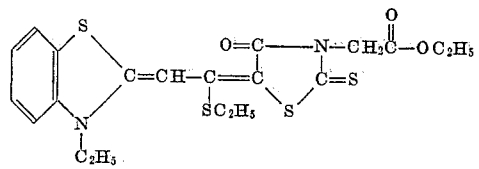

3 - carbethoxymethyl-5-(1'-ethylthioethylidene)-2-thiothiazolid-4-one (1.0 g.), 2-ethylthiobenzthiazole etho-p-toluenesulfonate (1.3 g.), ethanol (10 cc.) and triethylamine (0.5 cc.) were refluxed for 5 minutes. The dye (0.9 g., 58%) crystallized from the magenta solution on chilling. It formed flat, green needles, M. P. 157° C. from ethanol. It sensitized a silver chlorobromide with a peak at 620 mu.

EXAMPLE 3

*2 - [2 - (3 - carbethoxymethyl-4-keto-2-thiothiazolidin-5-ylidene) - 2-ethyl thioethylidene]-4-(3-ethylbenzoxazolin-2-ylidene-ethylidene)-3-methyl thiazolid-5-one*

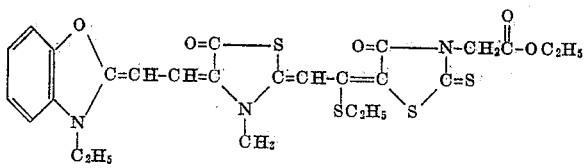

4-(3-ethylbenzoxazolin-2-ylidene-ethylidene)-2 - ethylthiothiazol-5-one (1.65 g.) and methyl p-toluenesulfonate (0.95 g.) were fused together at 130° C. for 1 hour. 3-carbethoxymethyl - 5 - (1'-ethylthioethylidene)-2-thiothiazolid-4-one (1.5 g.), ethanol (20 cc.) and triethyl amine (0.8 cc.) were added and the whole refluxed for 10 minutes. The dye (1.0 g., 34%) which separated was collected, washed with ethanol and formed brilliant green tablets, M. P. 257° C., after two recrystallizations from pyridine-ethanol. It sensitized a silver chlorobromide powerfully with a peak at 750 mu.

EXAMPLE 4

*2 - [2 - (3-carbethoxymethyl-4-keto-2-thiothiazolidin-5-ylidene)-2-ethylthioethylidene]-4-(3-ethylbenzthiazolin-2-ylidene)-3-methyl thiazolid-5-one*

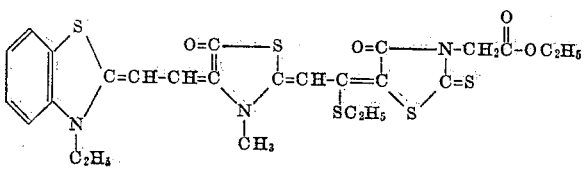

By using 4-(3-ethylbenzthiazolin-2-ylidene-ethylidene)-2-ethylthiothiazolin-5-one (1.75 g.) instead of the benzoxazole analogue used in Example 3 the dye (1.05 g., 34.8%) was obtained as soft green threads with a bronze reflex, M. P. 239° C., after two recrystallizations from pyridine-ethanol. It sensitized a silver chlorobromide emulsion powerfully with a peak at 780 mu.

EXAMPLE 5

*2 - [2 - (3 - carbethoxymethyl-4-keto-2-thiothiazolidin-5-ylidene) - 2-ethylthioethylidene]-3-ethyl-5-(3-ethylbenzoxazolin-2-ylidene-ethylidene) thiazolid-4-one*

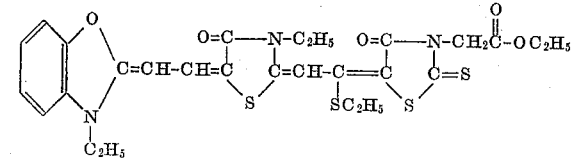

3 - ethyl-5-(3-ethylbenzoxazolin-2-ylidene-ethylidene)-2-thiothiazolid-4-one (1.65 g.) and methyl p-toluenesulfonate (0.95 g.) were fused at 130° for 30 minutes. The solid quaternary salt was broken up, 3-carbethoxymethyl-5-(1'-ethylthioethylidene)-2-thiothiazolid-4-one (1.5 g.), ethanol (10 cc.) and triethylamine (0.8 cc.) were added and the whole refluxed for 10 minutes. The dye was collected after cooling and washed with ethanol. It (1.95 g., 65%) formed green-bronze threads, M. P. 224° C., from pyridine-ethanol.

EXAMPLE 6

*3 - carbethoxymethyl - 5-[4-(3-ethylbenzthiazolin-2-ylidene) - 1 - ethylthiobut-2-en-1-ylidene]-2-thiothiazolid-4-one*

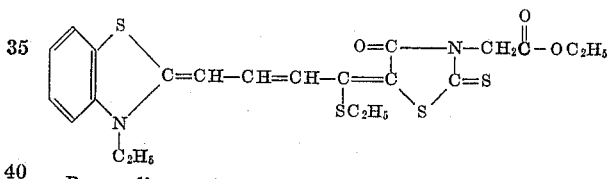

Proceeding as for Example 1 but using 2-β-acetanilidovinylbenzthiazole ethiodide (1.5 g.) the dye (1.2 g., 69%) formed soft flat blue green needles, M. P. 174° C.

EXAMPLE 7

*3 - carbethoxymethyl - 2 - [2 - (3 - carbethoxymethyl-4 - keto - 2 - thiothiazolidin - 5 - ylidene) - 2 - ethylthioethylidene] -5 - piperid - 1' - ylmethylenethiazolid-4-one*

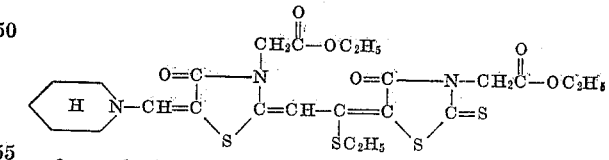

3 - carbethoxymethyl - 5 - piperid - 1' - ylmethylene-2-thiothiazolid-4-one (1.6 g.) and methyl p-toluenesulfonate were fused at 125° C. for 1 hour. 3-carbethoxymethyl - 5 - (1' - ethylthioethylidene) - 2 - thiothiazolid-4-one (1.5 g.), ethanol (10 cc.) and triethylamine (0.8 cc.) were added and refluxed 10 minutes. The magenta solution deposited the dye on chilling. It (0.7 g., 24%) formed magenta threads, M. P. 168° C., from benzene-ethanol.

EXAMPLE 8

*3 - carbethoxymethyl - 5 - [4 - (3 - ethylbenzoxazolin - 2-ylidene) - 1 - isopropylthiobut - 2 - en - 1 - ylidene]-2-thiothiazolid-4-one*

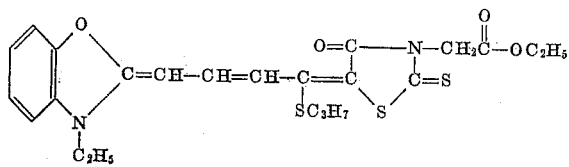

3-carbethoxymethyl - 5 - (1' - i - propylthioethylidene-2 - thiothiazolid - 4 - one (1.6 g.), 2 - β - acetanilidovinyl-benzoxazole ethiodide (2.15 g.), ethanol (10 cc.) and triethylamine (0.8 cc.) were refluxed for 10 minutes and the blue solution chilled. Collected and washed with ethanol it (1.1 g., 45%) formed soft, deep blue needles, M. P. 153° C., from ethanol.

EXAMPLE 9

3 - carbethoxymethyl - 5 - [ 4 - (3 - ethylbenzoxazolin-2 - ylidene) - 1 - n - butyl thiobut - 2 - en - 1 - ylidene]-2-thiothiazolid-4-one

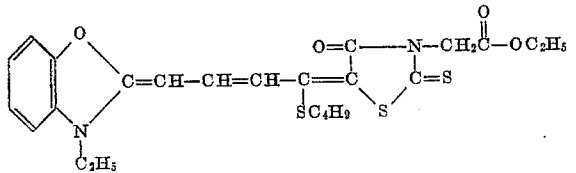

3 - carbethoxymethyl - 5 - (1' - n - butylthioethylidene-2-thiothiazolid-4-one (1.66 g.), 2-β-acetanilidovinylbenzoxazole ethiodide (2.17 g.), ethanol (10 cc.) and triethylamine (0.8 cc.) were refluxed for 5 minutes. The dye (1.2 g., 47.5%), collected after chilling, formed brassy green prisms, M. P. 151° C. from ethanol.

EXAMPLE 10

3 - carbethoxymethyl - 5 - [4 - (3 - ethylbenzoxazolin-2 - ylidene) - 1 - p - tolythiobut - 2 - en - 1 - ylidene]-2-thiothiazolid-4-one

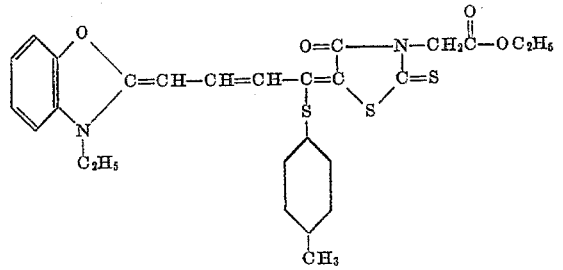

3 - carbethoxymethyl - 5 (1' - p - tolythioethylidene)-2-thiothiazolid-4-one (M. P. 139–140° C.) (0.75 g.), 2-β-acetanilidovinylbenzoxazole ethiodide (0.9 g.), ethanol (10 cc.) and triethylamine (0.4 cc.) were refluxed for 10 minutes. The dye which had crystallized was collected after chilling and washed with ethanol. It (0.5 g., 45%) formed steel-grey threads, M. P. 173° C., from benzene and ethanol.

EXAMPLE 11

4 - [2 - (3 - ethylbenzthiazolin - 2 - ylidene) - 1 - ethylthioethylidene]-2-ethylthiothiazol-5-one

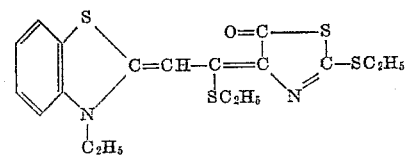

2-ethylthiobenzthiazole etho-p-toluenesulfonate (2.0 g.), 2 - ethylthio - 4 -(1' - ethylthioethylidene)thiazol-5-one (1.1 g.), ethanol (10 cc.) and triethylamine (0.8 cc.) were refluxed for 5 minutes. The dye (1.1 g., 54%) collected after chilling formed large green-gold aggregates, M. P. 113° C.

EXAMPLE 12

4 - [4 - (3 - ethylbenzthiazolin - 2 - ylidene) - 1 - ethylthiobut-2-en-1-ylidene]-2-ethylthiothiazol-5-one

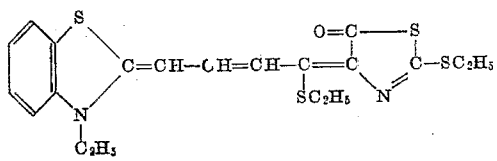

2-β-anilinovinylbenzthiazole ethiodide (2.0 g.), 2-ethylthio-4-(1'-ethylthioethylidene)thiazol-5-one (1.1 g.), ethanol (10 cc.), triethylamine (2 cc.) and acetic anhydride (0.5 cc.) were refluxed for 5 minutes. The dye slowly crystallized on chilling for several days. It (0.8 g., 39%) formed flat, gold-green needles, M. P. 162° C. from benzene-ethanol.

EXAMPLE 13

3 - ethyl - 5 - (3 - ethylbenzoxazolin - 2 - ylidene - ethylidene) - 2 - [2 - ethylthio - 2 - (2 - ethylthio - 5 - ketothiazolin - 4 - ylidene)ethylidene]thiazolid - 4 - one

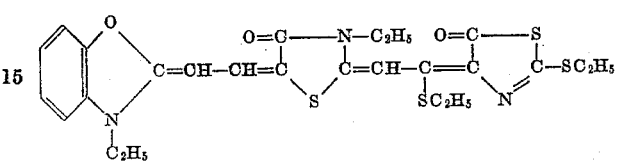

3 - ethyl - 5 - (3 - ethylbenzoxazolin - 2 - ylideneethylidene)-2-thiothiazolid-4-one (1.65 g.) and methyl p-toluenesulfonate (1.0 g.) were fused together at 140° for 20 minutes. 2-ethylthio-4-(1'-ethylthioethylidene)thiazol-5-one (1.1 g.), ethanol (10 cc.) and triethylamine (0.8 cc.) were added and the whole heated on the steam bath for 15 minutes. The dye (1.45 g., 53%) which separated on chilling formed brilliant, brassy needles, M. P. 194° C., from benzene-ethanol.

EXAMPLE 14

3 - ethyl - 5 - (3 - ethylbenzthiazolin - 2 - ylidene - ethylidene) - 2 - [2 - ethylthio - 2 - (2 - ethylthio - 5 - ketothiazolin-4-ylidene)]thiazolid-4-one

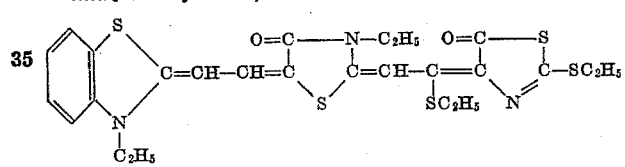

Obtained similarly from the benzthiazole analogue (1.75 g.), the dye (1.35 g., 48%) formed soft, dark brown needles, M. P. 198° C., from benzene-ethanol.

EXAMPLE 15

3 - allyl - 5 - [1 - (3 - ethylbenzthiazolin - 2 - ylidene)but-2 - ylidene] - 2 - [2 - ethylthio - 2 - (2 - ethylthio - 5-ketothiazolin-4-ylidene)ethylidene]thiazolid-4-one

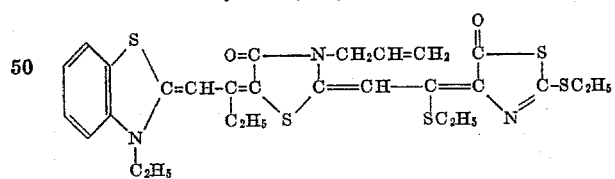

Obtained similarly in 50% yield from 3-allyl-5-[1-(3-ethylbenzthiazolin - 2 - ylidene)but - 2 - ylidene] - 2-thiothiazolid-4-one (1.9 g.) it formed black needles, with a gold reflex, M. P. 147° C., from benzene-ethanol.

EXAMPLE 16

3 - allyl - 2 - [2 - ethylthio - 2 - (2 - ethylthio - 5 - ketothiazolin - 4 - ylidene)ethylidene] - 5 - morpholin - 3'-ylmethylene thiazolid - 4 - one

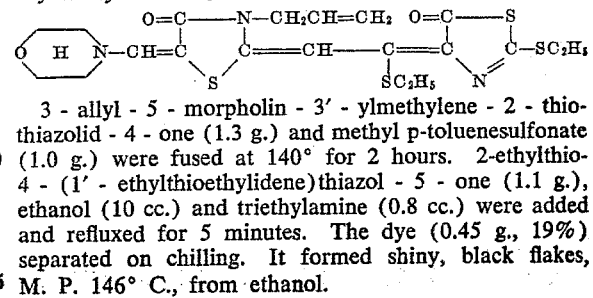

3 - allyl - 5 - morpholin - 3' - ylmethylene - 2 - thiothiazolid - 4 - one (1.3 g.) and methyl p-toluenesulfonate (1.0 g.) were fused at 140° for 2 hours. 2-ethylthio-4 - (1' - ethylthioethylidene)thiazol - 5 - one (1.1 g.), ethanol (10 cc.) and triethylamine (0.8 cc.) were added and refluxed for 5 minutes. The dye (0.45 g., 19%) separated on chilling. It formed shiny, black flakes, M. P. 146° C., from ethanol.

EXAMPLE 17

3 - allyl - 2 - [2 - ( 2 - benzylthio - 5 - ketothiazolin - 4 - ylidene) - 2 - ethylthioethylidene] - 5 - [1 - (3 - ethylbenzthiazolin - 2 - ylidene)but - 2 - ylidene]thiazolid - 4 - one

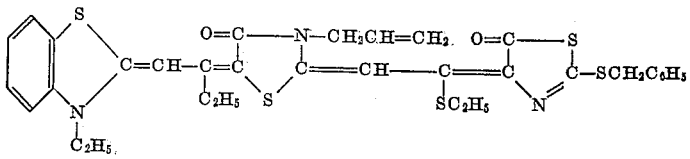

Proceeding as in Example 15 but using 2-benzylthio-4 - (1' - ethylthioethylidene)thiazol - 5 - one (1.03 g.), the dye was obtained in 31.6% yield as fine, dark green crystals, M. P. 138° C. from benzene-ethanol.

EXAMPLE 18

2 - [2 - ethylthio - 2 - (2 - ethylthio - 5 - ketothiazolin - 4 - ylidene)ethylidene] - 4 - (3 - ethylbenzoxazolin-2-ylidene - ethylidene) - 3 - methylthiazolid - 5 - one

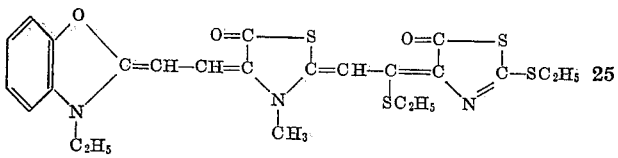

2 - ethylthio - 4 - (3 - ethylbenzoxazolin - 2 - ylidene-ethylidene)thiazol - 5 - one (1.65 g.) and methyl p-toluenesulfonate (0.95 g.) were fused at 130° C. for 2 hours. 2 - ethylthio - 4 - (1' - ethylthioethylidene)-thiazol - 5 - one (1.25 g.), ethanol (15 cc.) and triethylamine (0.8 cc.) were added and refluxed for 5 minutes. The dye (0.9 g., 34%) collected after chilling formed flat, green needles, M. P. 203° C.

EXAMPLE 19

2 - [2 - ethylthio - 2 - (2 - ethylthio - 5 - ketothiazolin - 4 - ylidene)ethylidene] - 4 - (3 - ethylbenzthiazolin - 2 - ylidene - ethylidene) - 3 - methylthiazolid - 5 - one

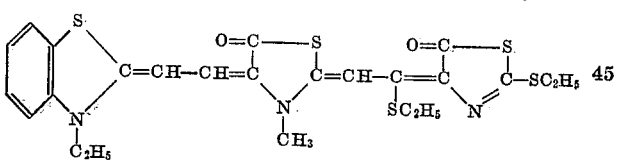

2 - ethylthio - 4 - (3 - ethylbenzthiazolin - 2 - ylidene-ethylidene)thiazol - 5 - one (1.75 g.) was treated as the dye of Example 18, then reacted in the same way to give 0.9 g. (33%) of bronze threads, M. P. 203° C., after twice recrystallizing from pyridine.

EXAMPLE 20

3 - benzyl - 5 - [4 - (3 - ethylbenzthiazolin - 2 - ylidene) - 1 - ethylthio but - 2 - en - 1 - ylidene] - 2 - thiothiazolid - 4 - one

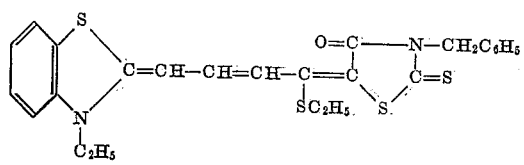

2 - β - anilinovinylbenzthiazole ethiodide (2.0 g.), 3-benzyl - 5 - (1' - ethylthioethylidene) - 2 - thiothiazolid-4 - one (1.5 g.), ethanol (10 cc.) triethylamine (3.0 cc.) and acetic anhydride (1 cc.) were refluxed for 5 minutes. The dye which tended to tar out was obtained crystalline by adding ethanol (15 cc.) and refluxing then allowing to cool. It (1.6 g.) formed dark green needles or green tablets, M. P. 186° C., from benzene-ethanol.

EXAMPLE 21

3 - carbethoxymethyl - 5 - [4 - (3 - ethyl - 4:5 - diphenyloxazolin - 2 - ylidene) - 1 - ethylthiobut - 2 - en - 1 - ylidene] - 2 - thiothiazolid - 4 - one

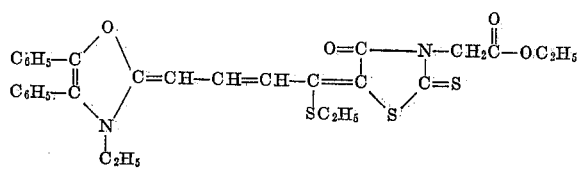

2 - β - anilinovinyl - 4:5 - diphenyloxazole etho - p-toluenesulfonate (1.8 g.), 3 - carbethoxymethyl - 5 - (1'-ethylthioethylidene) - 2 - thiothiazolid - 4 - one (1.0 g.), ethanol (15 cc.), triethylamine (1.0 cc.) and acetic anhydride (0.5 cc.) were refluxed for 10 minutes. The dye oiled out on chilling. The liquor was decanted, the oil dissolved in boiling ethanol (30 cc.) and the dye crystallized on scratching. The decanted liquor gave a further crop on seeding. It (0.75 g., 39%) formed moss green crystals, M. P. 162° C., or green-gold tablets, M. P. 172° C.

EXAMPLE 22

3 - carbethoxymethyl - 5 - [4 - (3 - ethylnaphtho - 2':1' - 4:5 - thiazolin - 2 - ylidene) - 1 - ethylthiobut - 2 - en - 1 - ylidene] - 2 - thiothiazolid - 4 - one

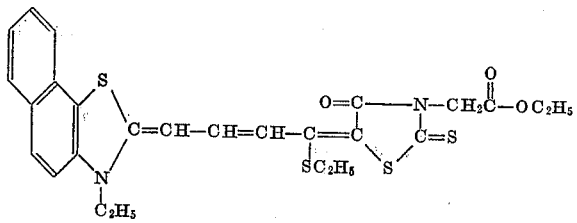

Obtained similarly in 91% yield the dye formed brilliant, green flakes, M. P. 226–227° C., from benzene-ethanol.

EXAMPLE 23

3 - carbethoxymethyl - 5 - [2 - (3 - ethylbenzthiazolin - 2 - ylidene) - 1 - p - tolylthioethylidene] - 2 - thiothiazolid - 4 - one

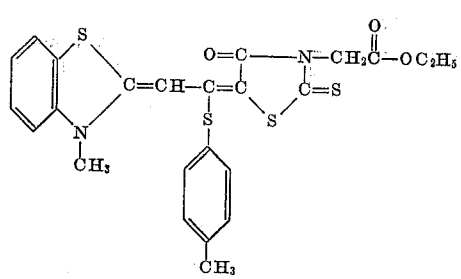

2 - ethylthiobenzthiazole etho - p - toluenesulfonate (1.0 g.), 3 - carbethoxymethyl - 5 - (1' - p - tolylthioethylidene) - 2 - thiothiazolid - 4 - one (0.95 g.), ethanol (10 cc.) and triethylamine (0.4 cc.) were refluxed for 5 minutes. The crystals (0.45 g., 34%) collected after chilling formed flat, brassy needles, M. P. 237–239° C., from benzene-ethanol.

EXAMPLE 24

3 - carbethoxymethyl - 5 - [1 - p - tolylthio - 4 - (1:3:3-trimethylindolin - 2 - ylidene) but - 2 - en - 1 - ylidene]-2 - thiothiazolid - 4 - one

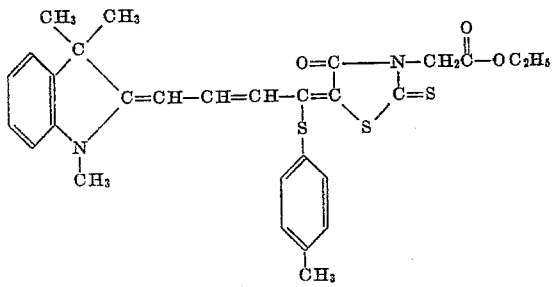

2 - β - acetanilidovinyl - 3:3 - dimethylindolenine methiodide (0.9 g.), 3 - carbethoxymethyl - 5 - (1' - p-tolylthioethylidene) - 2 - thiothiazolid - 4 - one (0.75 g.), pyridine (10 cc.) triethylamine (0.4 cc.) were stood for 48 hours. Precipitation with water gave green crystals (0.5 g., 45.5%) which formed brilliant flat green needles, M. P. 148° C., from ethanol.

EXAMPLE 25

3 - carbethoxymethyl - 5 - [2 - (3 - ethyl - 4:5 - diphenyl-thiazolin - 2 - ylidene) - 1 - ethylthioethylidene] - 2-thiothiazolid - 4 - one

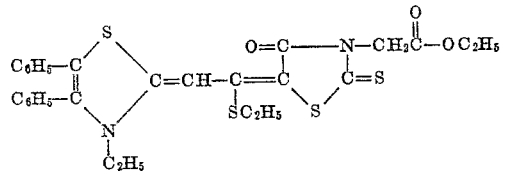

Obtained similarly to Example 2 but using 2-ethylthio-4:5-diphenylthiazole etho-p-toluenesulfonate (1.3 g.), the dye was obtained in 52% yield as violet-green needles, M. P. 193° C., from benzene-ethanol.

EXAMPLE 26

3-carbethoxymethyl-5-[1-ethylthio-2-(3-methylthiazolidin-2-ylidene)ethylidene]-2-thiothiazolid-4-one

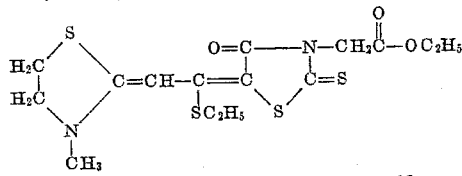

2-methylthiothiazoline metho-p-toluenesulfonate (1.6 g.), 3 - carbethoxymethyl - 5 - (1' - ethylthioethylidene)-2 - thiothiazolid - 4 - one (1.5 g.), pyridine (10 cc.) and triethylamine (0.8 cc.) were heated on the steam bath for 15 minutes. Water (30 cc.) was added to precipitate the dye as a tar which soon crystallized on chilling. It (1.3 g., 64.5%) formed flat red needles, M. P. 139–143° C. Further recrystallization from ethanol gave first glossy red flakes, M. P. 152–154° C. and soft red needles, M. P. 131° C. were obtained from the filtrate on concentration.

EXAMPLE 27

3-cyclohexyl-5-[1-ethylthio-2-(3-methylthiazolidin-5-ylidene)ethylidene]-2-thiothiazolid-4-one

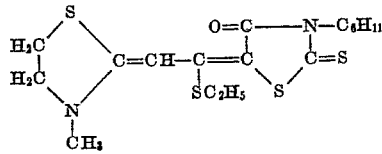

Obtained similarly but using 3-cyclohexyl-5-(1'-ethylthioethylidene)-2-thiothiazolid-4-one (1.5 g.), the dye (2.1 g., 100%) on recrystallization four times from ethanol gave flat red needles, M. P. 183–189° C. (40%).

EXAMPLE 28

2 - [2 - benzylthio - 2 - (3 - carbethoxymethyl - 4 - keto-2 - thiothiazolidin - 5 - ylidene)ethylidene] - 4 - (3-ethylbenzthiazolin - 2 - ylidene - ethylidene) - 3 - methylthiazolid-5-one

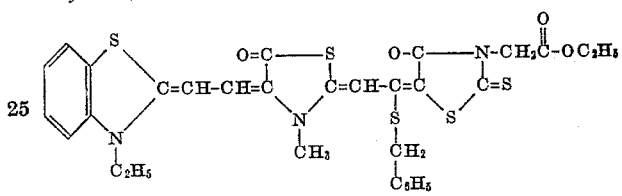

2-ethylthio - 4 - (3 - ethylbenzthiazolin - 2 - ylidene-ethylidene)thiazol-5-one (1.75 g.) and methyl p-toluenesulfonate (1.0 g.) were fused at 130° C. for 2 hours. 5 - (1' - benzylthioethylidene - 3 - carbethoxymethyl - 2-thiothiazolid-4-one (1.85 g.), ethanol (20 cc.) and triethylamine (0.8 cc.) were added and refluxed 10 minutes. Collected hot and washed with acetone the dye (1.05 g., 31.5%) formed flat, dark green needles, M. P. 240° C., from pyridine-ethanol.

EXAMPLE 29

2 - [2 - (3 - carbethoxymethyl - 4 - keto - 2 - thiothiazolid-5 - ylidene) - 2 - ethylthioethylidene] - 4 - (3 - ethyl-4:5 - diphenylthiazolin - 2 - ylidene - ethylidene) - 3 - methylthiazolid-5-one

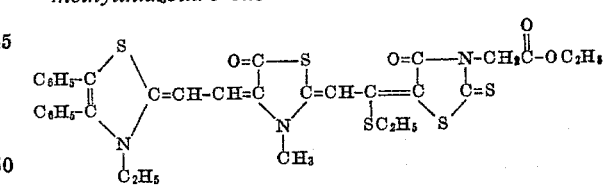

2 - ethylthio - 4 - (3 - ethyl - 4:5 - diphenylthiazolin-2 - ylidene - ethylidene)thiazol - 5 - one (2.25 g.) and methyl p-toluenesulfonate (1.0 g.) were fused at 130° C. for 2 hours. 3 - carbethoxymethyl - 5 - (1' - ethylthio-ethylidene)-2-thiothiazolid-4-one (1.55 g.), ethanol (15 cc.) and triethylamine (0.8 cc.) were added and refluxed for 5 minutes. The dye (2.55 g., 72%) formed bright green needles, M. P. 264° C., from pyridine-ethanol.

EXAMPLE 30

3 - carbethoxymethyl - 2 - [2 - ethylthio - 2 - (2 - ethylthio-5 - ketothiazolin - 4 - ylidene)ethylidene] - 5 - {2 - [4-(3 - ethyl - 4:5 - diphenylthiazolin - 2 - ylidene - ethylidene) - 5 - keto - 3 - methylthiazolidin - 2 - ylidene] - 1-ethylthioethylidene}thiazolid-4-one

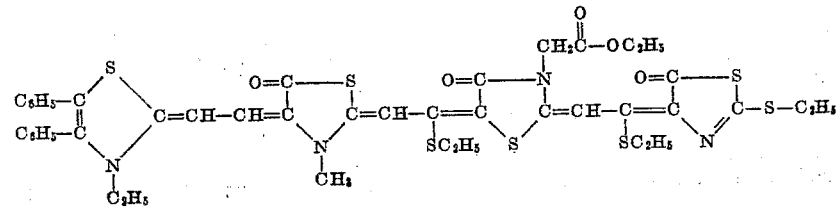

Dye of Example 29 (0.95 g.) and methyl p-toluenesulfonate (0.45 g.) were fused at 130° for 1 hour. 2-ethylthio - 4 - (1' - ethylthioethylidene)thiazol - 5 - one (0.35 g.), ethanol (20 cc.) and triethylamine (0.25 cc.) were added and refluxed for 5 minutes. The dye separated and was collected after chilling. It (0.7 g., 56.5%) formed flat bronze-green needles, M. P. 230° C. (previous shrinking) after two recrystallizations from pyridine-ethanol. Further recrystallization from benzene gave soft bronze needles, M. P. 258° C.

EXAMPLE 31

2 - [2 - (3 - carbethoxymethyl - 4 - keto - 2 - thiothiazolidin- 5 - ylidene) - 2 - ethylthioethylidene] - 4 - (3 - ethylbenzselenazolin - 2 - ylidene - ethylidene) - 3 - methylthiazolid-5-one

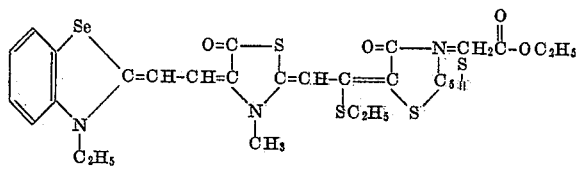

2 - ethylthio - 4 - (3 - ethylbenzselenazolin - 2 - ylidene-ethylidene - 3 - methylthiazol - 5 - one (4.0 g.) and methyl p-toluenesulfonate (2.0 g.) were fused at 130° C. for 2 hours. 3 - carbethoxymethyl - 5 - 1' - ethylthioethylidenerhodanine (3.1 g.), pyridine (20 cc.) and triethylamine (1.5 cc.) were added and the whole heated on the steam bath for 15 minutes. The dye (32 g., 49%) which crystallized after the addition of ethanol (50 cc.) formed glittering green crystals, M. P. 236–237.° C., from benzene.

It sensitized a silver chlorobromide emulsion with a peak at 770 mμ at 0.05 g./1000 g. equivalent of silver nitrate.

EXAMPLE 32

3 - carbethoxymethyl - 2 - [2 - ethylthio - 2 - (2 - ethylthio- 5 - ketothiazolin - 4 - ylidene)ethylidene] - 5 - {2 - [4- (3 - ethylbenzselenazolin - 2 - ylidene - ethylidene) - 5- keto - 3 - methylthiazolidin - 2 - ylidene] - 1 - ethylthioethylidene}thiazolid-4-one

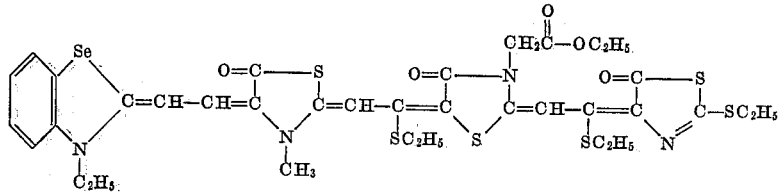

The dye of Example 31 (1.3 g.) and methyl p-toluenesulfonate (0.6 g.) were fused at 130° C., for 1 hour. The solid quaternary salt was broken up, 2-ethylthio-4-1'-ethylthioethylidene thiazol - 5 - one (0.5 g.), pyridine (10 cc.) and triethylamine (0.4 cc.) added and heated for 5 minutes on the steam bath. The addition of ethanol (50 cc.) caused the dye to crystallize. It (1.2 g., 62%) formed deep golden threads, M. P. 220° C., from benzene.

EXAMPLE 33

3 - carbethoxymethyl - 2 - (3 - carbethoxymethyl - 4 - keto- 2 - thiothiazolidin - 5 - ylidene) - 5-{2-[4-(3-ethylbenzselenazolin - 2 - ylidene - ethylidene) - 5 - keto - 3- methylthiazolidin - 2 - ylidene] - 1 - ethylthioethylidene}-thiazolid-4-one

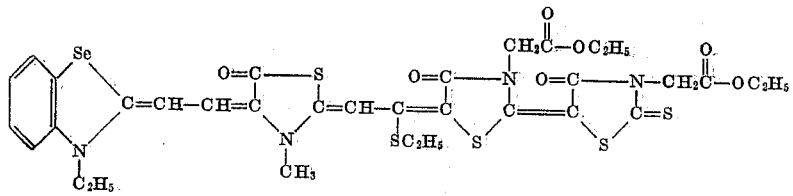

The dye of Example 31 (1.3 g.) was fused with methyl p-toluenesulfonate (0.6 g.) at 130° for 1 hour. 3-carbethoxymethylrhodanine (0.5 g.), pyridine (10 cc.) and triethylamine (0.3 cc.) were added and the whole heated on the steam bath for 5 minutes. The dye separated during this time. It (1.25 g., 75%) formed brilliant golden flakes, M. P. 288° C., from pyridine.

EXAMPLE 34

3 - carbethoxymethyl - 2 - [2 - (3 - carbethoxymethyl - 4 - keto - 2 - thiothiazolidin - 5 - ylidene) - 2 - ethylthioethylidene] - 5 - {2 - [4 - (3 - ethylbenzselenazolin - 2 - ylidene - ethylidene) - 5 - keto - 3 - methylthiazolidin - 2 - ylidene] - 1 - ethylthioethylidene}thiazolid - 4 - one

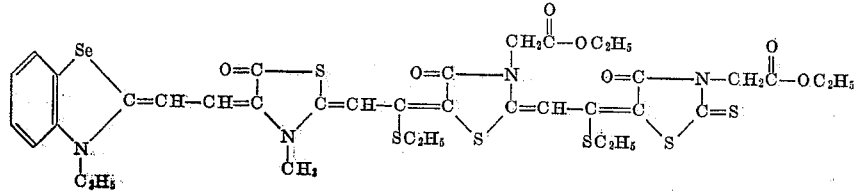

The dye of Example 31 (1.3 g.) was quaternized as in Example 32, 3-carbethoxymethyl-5-1'-ethylthioethylidene-rhodanine (0.7 g.), pyridine (15 cc.), and triethylamine (0.3 cc.) added and heated on the steam bath for 5 minutes. Ethanol (20 cc.) was added and the dye (1.35 g., 73%) collected after chilling and washed with acetone. It formed deep bronze threads, M. P. 268° C., from pyridine-ethanol.

EXAMPLE 35

*3 - carbethoxymethyl - 5 - [2 - (3 - ethylbenzthiazolin - 2 - ylidene) - 1 - n - octylthioethylidene] - 2 - thiothiazolid - 4 - one*

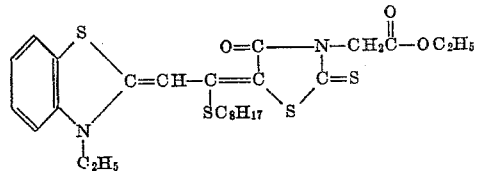

3-carbethoxymethyl-5-(1'-n-octylthioethylidene)-2-thiothiazolid-4-one (1.5 g.), 2-ethylthiobenzthiazole etho-p-toluenesulfonate (1.5 g.), ethanol (10 cc.) and triethylamine (0.6 cc.) were heated on the steam bath for 5 minutes. The magenta solution was chilled overnight and the dye collected and washed with ethanol. It (0.85 g., 40.5%) formed soft, dark green flakes, M. P. 103° C., from ethanol.

EXAMPLE 36

*3 - carbethoxymethyl - 5 - [4 - (3 - ethylbenzthiazolin - 2 - ylidene) - 1 - n - octylthiobut - 2 - en - 1 - ylidene] - 2 - thiothiazolid - 4 - one*

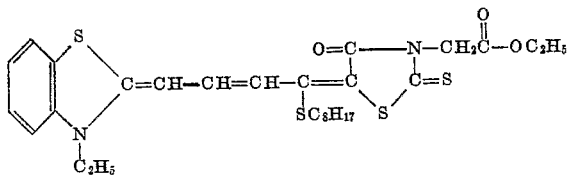

3-carbethoxymethyl-5-(1'-n-octylthioethylidene)-2-thiothiazolid-4-one (2.0 g.), 2-β-acetanilidovinylbenzthiazole etho-p-toluenesulfonate (2.25 g.), ethanol (15 cc.) and triethylamine (0.8 cc.) were refluxed for 15 minutes, scratched while hot until crystallization occurred and the whole chilled overnight. The dye (2.15 g., 74.5%) after an ethanol wash was recrystallized from benzene-ethanol, then ethanol and was obtained as glossy green needles, M. P. 107° C.

EXAMPLE 37

*3 - carbethoxymethyl - 5 - [4 - (3 - ethylnaphtho - 1':2':4:5 - thiazolin - 2 - ylidene) - 1 - ethylthiobut - 2 - en - 1 - ylidene] - 2 - thiothiazolid - 4 - one*

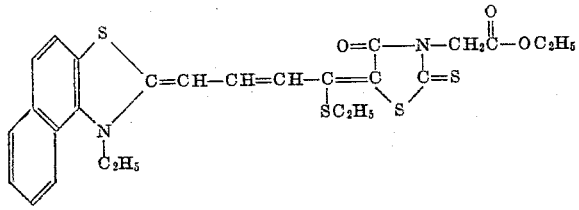

3-carbethoxymethyl-5-(1'-ethylthioethylidene)-2-thiothiazolid-4-one (1.5 g.), 2-β-acetanilidovinylnaphtho-1':2':4:5-thiazole ethiodide (2.5 g.), ethanol (20 cc.) and triethylamine (0.8 cc.) were refluxed for 5 minutes. The dye (1.75 g., 65%) formed brilliant, green flakes, M. P. 241° C., from pyridine-ethanol.

EXAMPLE 38

*4 - [4 - (3 - ethylnaphtho - 1':2':4:5 - thiazolin - 2 - ylidene) - 1 - ethylthiobut - 2 - en - 1 - ylidene] - 2 - ethylthiazol - 5 - one*

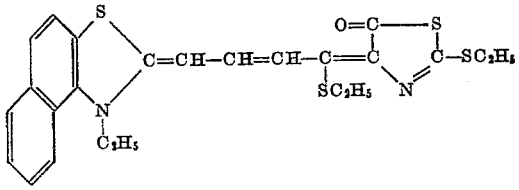

2-β-acetanilidovinylnaphtho-1':2':4:5-thiazole ethiodide (2.5 g.), 3-cyclohexyl-5-(1'-ethylthioethylidene) - 2 - thiothiazolid-4-one (1.25 g.), ethanol (20 cc.) and triethylamine (0.8 cc.) were refluxed for 5 minutes. The dye (1.25 g., 56%) collected after chilling formed soft green needles, M. P. 198° C., from benzene.

EXAMPLE 39

*4 - [4 - (3 - ethylnaphtho - 2':1':4:5 - thiazolin - 2 - ylidene) - 1 - ethylthiobut - 2 - en - 1 - ylidene] - 2 - ethylthiothiazol - 5 - one*

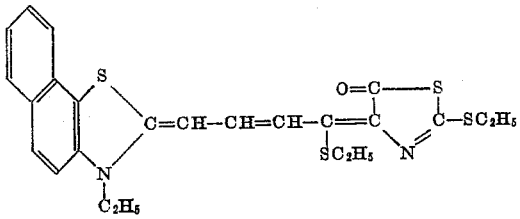

2-β-acetanilidovinylnaphtho-2':1':4:5-thiazole ethiodide (2.5 g.) was reacted as in Example 38 in place of the isomer and the dye (1.5 g., 62%) obtained as soft green needles, M. P. 178° C., from benzene-ethanol.

EXAMPLE 40

*3 - carbethoxymethyl - 5 - [2 - (3 - ethylbenzthiazolin - 2 - ylidene) - 1 - ethylthioethylidene] - 2 - [2 - ethylthio - 2 - (2 - ethylthio - 5 - ketothiazolin - 4 - ylidene) - ethylidene]thiazolid - 4 - one*

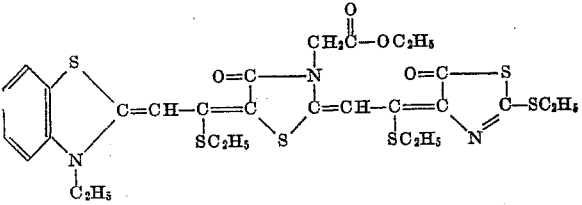

Dye of Example 2 (1.55 g.) and methyl p-toluenesulfonate (0.7 g.) were fused together at 135° C. for 1 hour. 2-ethylthio-4-1'-ethylthioethylidenethiazol-5-one (0.85 g.), pyridine (10 cc.) and triethylamine (0.5 cc.) were added and refluxed for 5 minutes. Ethanol (70 cc.) was added and chilled. The dye (0.65 g.) formed brassy needles, M. P. 187° C., from benzene-ethanol.

As shown in a number of the above examples, my new merocyanine dyes (i. e. trinuclear dyes) can be quaternized with an alkyl salt, such as those represented by Formulas V and VIII above and the quaternized complex merocyanine dye condensed either with a further quantity of a compound selected from those represented by Formula III above or a compound containing a reactive ketomethylene group, such as those represented by the following general formula:

wherein Q₁ represents the non-metallic atoms necessary to complete a heterocyclic nucleus containing from 5 to 6 atoms in the heterocyclic ring. Representative compounds selected from those of Formula X have been previously described in my copending application with Per Aubert and Roy A. Jeffreys, Serial No. 220,332, filed March 2, 1951 (see Formula IV), now U. S. Patent 2,656,351, issued October 20, 1953.

As shown in a number of the above examples, the new complex dyes of my invention are useful in spectrally sensitizing photographic silver halide emulsions when incorporated therein. The dyes are useful especially for extending the spectral sensitivity of the customarily employed gelatino silver chloride, gelatino silver chlorobromide, gelatino silver bromide, gelatino silver bromiodide and gelatin silver chlorobromiodide developing-out emulsions. In several of the foregoing examples, the point of maximum sensitivity of gelatino silver chlorobromide and/or gelatino silver bromiodide emulsions sensitized with my new complex merocyanine dyes is pointed out in connection with the description of the properties of certain of the dyes. The following table supplements or summarizes the sensitizing data of certain of the dyes obtained in the above examples.

| Example | Silver Chlorobromide (mu maximum) | Silver Bromiodide (mu maximum) |
|---|---|---|
| 1 | 690 | 690 |
| 2 | 620 | 620 |
| 3 | 750 | 745 |
| 4 | 760 | 755 |
| 5 | 730 | |
| 6 | 730 | 730 |
| 7 | 540 | |
| 8 | 690 | 695 |
| 9 | 690 | 695 |
| 10 | 690 | 695 |
| 11 | 640 | 620 |
| 12 | 710 | 710 |
| 13 | 745 | 750 |
| 14 | 750 | 760 |
| 15 | 760 | 760 |
| 16 | 640 | 650 |
| 17 | 760 | 760 |
| 18 | 730 | 735 |
| 19 | 750 | 755 |
| 20 | 730 | 730 |
| 21 | 640, 690 | 695 |
| 22 | 750 | 750 |
| 23 | 635 | 630 |
| 25 | 630 | 630 |
| 26 | 575 | 570 |
| 27 | 580 | 570 |
| 28 | 760 | 760 |
| 29 | 770 | 770 |
| 30 | 750 | 760 |

To prepare emulsions sensitized with one or more of my new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Pyridine or acetone has proved satisfactory as a solvent for most of my new dyes. The dyes are advantageously incorporated in the finished, washed emulsions and should be uniformly distributed throughout the emulsions.

The concentration of the dyes in the emulsions can vary widely, e. g. from 5 to 100 mg. per liter of flowable emulsion. The concentration of the dyes willl vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of my new dyes, the following procedure is satisfactory:

A quantity of dye is dissolved in pyridine or acetone (or a mixture of acetone and pyridine) and a volume of this solution, which may be diluted with water, containing from 5 to 100 mg. of dye, is slowly added to about 1000 cc. of gelatino-silver-halide emulsion, with stirring. Stirring is continued until the dye is thoroughly dispersed in the emulsion.

With most of my dyes, from 10 to 20 mg. of dye per liter of gelatino-silver-bromide or bromiodide emulsion (containing about 40 g. of silver halide) suffices to produce the maximum sensitizing effect. With the finer grain emulsions, somewhat larger concentration of dye may be needed to produce the maximum sensitizing effect.

The above statements are only illustrative, as it will apparent that the dyes can be incorporated in photographic emulsions by any of the other methods customarily employed in the art, e. g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

Photographic silver halide emulsions, such as those listed above, containing the sensitizing dyes of my invention can also contain such addenda as chemical sensitizers (e. g. sulfur sensitizers, such as allyl thiocarbamide, thiourea, allylisothiocyanate, cystine, etc.), various gold compounds, such as potassium chloroaurate, auric tricholoride, etc. (see U. S. patents 2,540,085; 2,597,856; and 2,597,915, for example), various palladium compounds (such as palladium chloride (U. S. 2,540,086), potassium chloropalladate (U. S. 2,598,079), etc.), etc., or mixtures of such sensitizers, antifoggants (e. g. benzotriazole, nitrobenzimidazole, 5-nitroindazole, etc. (see Mees "The Theory of the Photographic Process," Macmillan Pub., pg. 460), or mixtures thereof), hardeners (e. g. formaldehyde (U. S. 1,763,533), chrome alum (U. S. 1,763,533), glyoxal (Ger. 538,713), dibromacrolein (Br. 406,750), etc.), color couplers (e. g. such as those described in U. S. Patent 2,423,730, Spence and Carroll U. S. application 771,380, filed August 29, 1947, now U. S. Patent 2,640,776, issued June 2, 1953, etc.), or mixtures of such addenda. Dispersing agents for color couplers, such as substantially water-insoluble, high boiling crystalloidal materials, such as those set forth in U. S. Patents 2,322,027 and 2,304,940, can also be employed in the above-described emulsions.

What I claim as my invention and desire secured by Letters Patent of the United States is:

1. A polymethine dye selected from those represented by the following general formula:

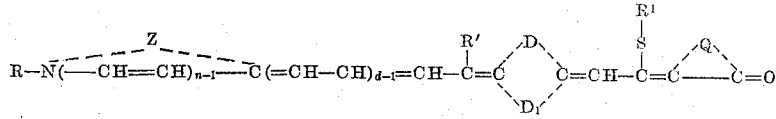

wherein R represents a lower alkyl group, $R_1$ represents a member selected from the group consisting of an alkyl group of the formula $C_qH_{2q+1}$ wherein $q$ is a positive integer of from 1 to 12 and a mononuclear aromatic group of the benzene series, R' represents a member selected from the group consisting of a hydrogen atom, a lower alkyl group, an alkoxyl group containing from 1 to 2 carbon atoms, an alkylthio group containing from 1 to 2 carbon atoms, an arylthio group containing from 6 to 7 carbon atoms and an aryl group containing from 6 to 7 carbon atoms, $n$ and $d$ each represents a positive integer of from 1 to 2, D and $D_1$ together represent the non-metallic atoms necessary to complete a thiazolidone nucleus, Q represents the non-metallic atoms necessary to complete a thiazole nucleus and Z represents the non-metallic atoms necessary to complete a heterocyclic nucleus selected from the group consisting of those of the thiazole series, those of the benzothiazole series, those of the naphthothiazole series, those of the thianaphtheno-7′,6′,4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3-isoquinoline series, those of the benzimidazole series, those of the 3,3-dialkylindolenine series and those of the pyridine series.

2. A polymethine dye selected from those represented by the following general formula:

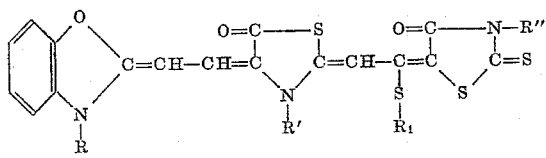

wherein R, R₁, R′ and R″ each represents a lower alkyl group.

3. A polymethine dye selected from those represented by the following general formula:

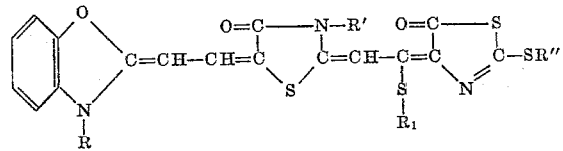

wherein R, R₁, R′ and R″ each represents a lower alkyl group.

4. A polymethine dye selected from those represented by the following general formula:

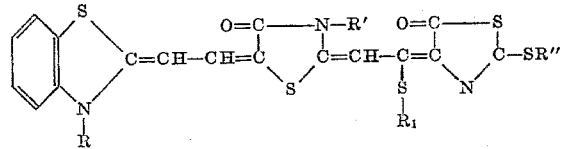

wherein R, R₁, R′ and R″ each represents a lower alkyl group.

5. A polymethine dye selected from those represented by the following general formula:

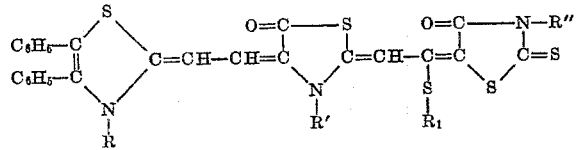

wherein R, R₁, R′ and R″ each represents a lower alkyl group.

6. A polymethine dye selected from those represented by the following general formula:

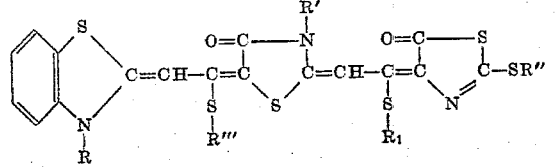

wherein R, R₁, R′, R″ and R‴ each represents a lower alkyl group.

7. A process for preparing a polymethine dye comprising condensing a compound selected from the group consisting of those represented by the following two general formulas:

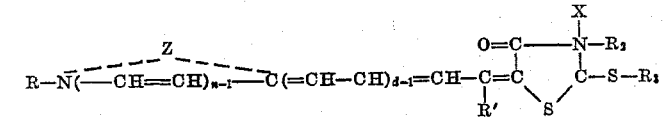

and

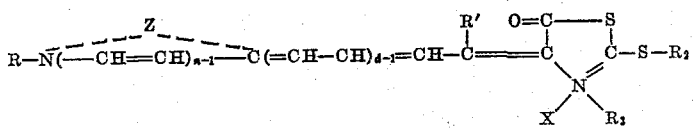

wherein R, R₂ and R₃ each represents a lower alkyl group, R′ represents a member selected from the group consisting of a hydrogen atom, a lower alkyl group, an alkoxyl group containing from 1 to 2 carbon atoms, an alkylthio group containing from 1 to 2 carbon atoms, an arylthio group containing from 6 to 7 carbon atoms and an aryl group containing from 6 to 7 carbon atoms, $n$ and $d$ each represents a positive integer of from 1 to 2, X represents an acid radical and Z represents the non-metallic atoms necessary to complete a heterocyclic nucleus selected from the group consisting of those of the thiazole series, those of the benzothiazole series, those of the naphthothiazole series, those of the thianaphtheno-7′,6′,4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3-isoquinoline series, those of the benzimidazole series, those of the 3,3-dialkylindolenine series and those of the pyridine series, together with a compound selected from those represented by the following general formula:

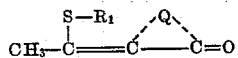

wherein R₁ represents an alkyl group of the formula $C_qH_{2q+1}$ wherein $q$ represents a positive integer of from 1 to 12 and a mononuclear aromatic group of the benzene series and Q represents the non-metallic atoms necessary to complete a thiazole nucleus.

8. A process according to claim 7 wherein the condensation is carried out in the presence of a basic condensing agent.

9. A process according to claim 8 wherein the basic condensing agent is triethylamine.

10. The polymethine dye represented by the following formula:

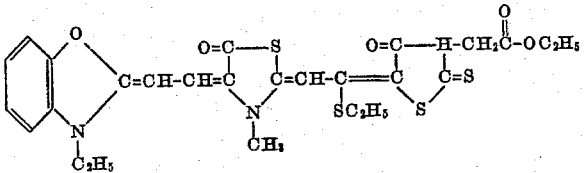

11. The polymethine dye having the following formula:

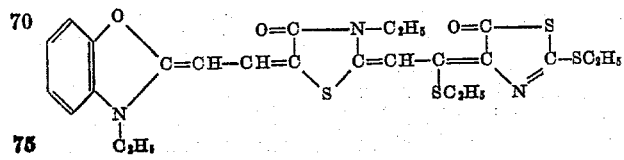

12. The polymethine dye represented by the following formula:
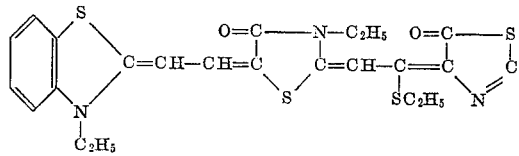
13. The polymethine dye having the following formula:
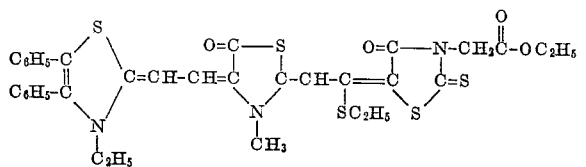
14. The polymethine dye having the following formula:
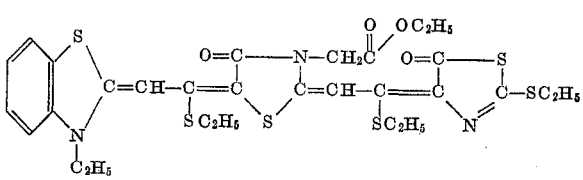
No references cited.